United States Patent Office 2,952,252
Patented Sept. 13, 1960

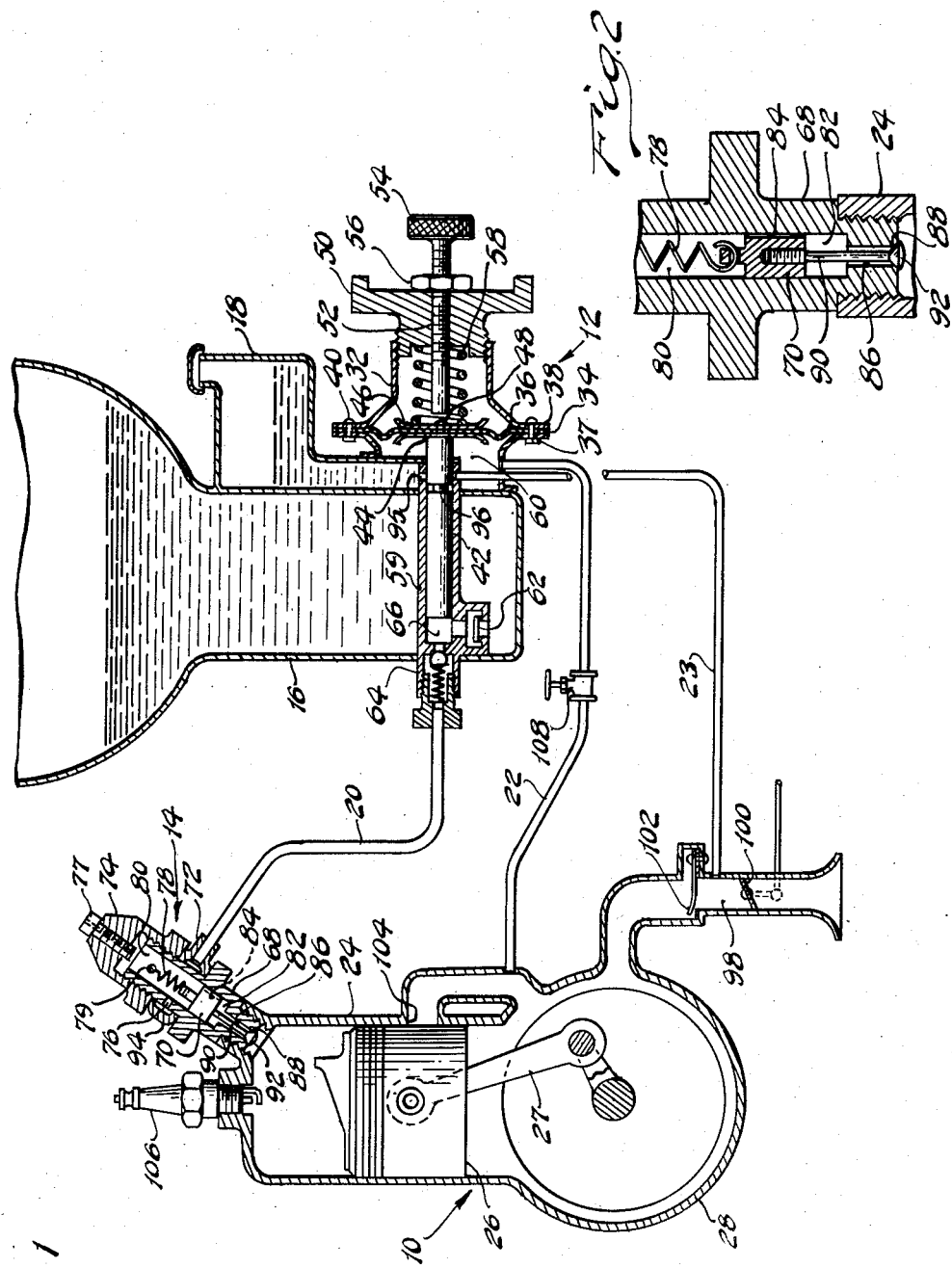

2,952,252
AUTOMATIC FUEL INJECTION SYSTEM

Charles F. Geatty, 11630 Washington,
Mount Morris, Mich.

Filed Feb. 24, 1959, Ser. No. 794,886

20 Claims. (Cl. 123—139)

The present invention refers generally to automatic fuel injection systems and more particularly to an automatic fuel injection system wherein crankcase compression pressure is used to facilitate the injection of fuel under pressure into the cylinder of a two cycle internal combustion engine.

In the past fuel injection systems for internal combustion engines have generally been complicated and expensive. This has been due largely to the fact that operating power for the fuel injection systems of the past has been generally obtained from the engine by means of gear trains or other equally complex mechanism. As a result of this complexity and resulting expense fuel injection systems have heretofore been limited to large engines or special installations where cost was not a major consideration. Consequently fuel injection has not generally been considered feasible for use with the usual two cycle internal combustion engine of the boat outboard motor type.

Therefore it is one of the objects of the present invention to provide a simple relatively inexpensive fuel injection system for two cycle internal combustion engines.

Another object is to provide a fuel injection system for two cycle internal combustion type motors for use with outboard motor boats, lawn mowers, snow plows, gardening tools, small power plants and the like.

Another object is to provide a fuel injection system for two cycle internal combustion engines using crankcase compression pressure to facilitate the injection of fuel under pressure into cylinder heads.

Another object is to provide means to more efficiently utilize fuel and lubricants in the operation of two cycle internal combustion engines such as outboard motors.

More specifically it is an object of the present invention to provide apparatus operated by the alternating pressures found in the crankcase of a two cycle internal combustion engine such as an outboard motor for a boat to inject fuel under pressure into the cylinder of the motor at the proper time to cause efficient combustion thereof.

More specifically it is an object of the present invention to provide apparatus operated by the alternating pressures found in the crankcase of a two cycle internal combustion engine such as an outboard motor for a boat to inject fuel under pressure into the cylinder of the motor at the proper time to cause efficient combustion thereof and to provide means simultaneously operated by the alternating pressures in the crankcase of the engine to separately lubricate the engine.

A further object is to provide fuel injection means for motors for use with outboard motor boats, lawn mowers, snow plows, gardening tools, small power plants and the like which may be easily installed on existing motors of the two cycle internal combustion type.

A further object is to provide fuel injection means for motors for use with outboard motor boats, lawn mowers, snow plows, gardening tools, small power plants and the like which are of the two cycle internal combustion type which may be installed so as to allow selection of normal operation of the engine or operation with fuel injection and separate lubrication.

Other objects and features of the invention will become apparent as the description proceeds, especially when taken in conjunction with the accompanying drawings illustrating a preferred embodiment of the invention, wherein:

Figure 1 is a diagrammatic representation of a fuel injection system according to the invention.

Figure 2 is an enlarged view of a portion of Figure 1.

A fuel injection system according to the invention is illustrated diagrammatically in the figure. According to the invention a two cycle internal combustion engine of the outboard motor type generally designated 10 is provided with a fuel injection pump 12 and a fuel injection valve 14. A separate fuel storage tank 16 and a separate lubricant storage tank 18 are also provided. The engine 10, pump 12, valve 14 and tanks 16 and 18 are connected by the fuel injection line 20, the pressure passage 22 and the lubricant line 23 as shown.

In the description of the invention a single cylinder 24, piston 26, connecting rod 27 and pressure sealed crankcase section 28 of a two cycle internal combustion engine 10 will be considered. It will be readily understood however that the invention herein set forth may be practiced with two cycle engines having a plurality of cylinders, pistons and separate crankcase sections by merely providing each cylinder with a separate fuel pump 12, injector valve 14 and connections as disclosed herein.

With particular reference to the figures, the fuel injection pump 12 is illustrated attached to the fuel tank 16 and the lubricant storage tank 18 by any suitable means such as welding. Fuel injection pump 12 includes an exterior housing 32 shaped as shown and split centrally as indicated at 34 to provide means for insertion of diaphragm 36 between flanges 37 and 38 of housing 32. Flanges 37 and 38 are secured together by suitable means such as screws 40 and serve to pressure seal diaphragm 36 within housing 32. A fuel injection plunger 42 is attached to diaphragm 36 by means of plates 44 and 46 and screw 48. An adjusting cap 50 is threaded into and closes the end of housing 32 as shown. Adjusting cap 50 is provided with an axial orifice 52 into which an adjustable plunger 54 is inserted. The plunger 54 is held in position by threaded nut 56 attached to adjusting cap 50. Spring 58 is secured between cap 50 and diaphragm plate 46 as shown.

In operation of fuel pump 12 pressure above atmospheric is directed into chamber 60 of fuel pump 12 through pressure passage 22 causing the diaphragm 36, fuel injection plunger 42, and plates 44 and 46 to move toward adjusting cap 50 in opposition to spring 58. Subsequently the pressure in chamber 60 is reduced below atmospheric causing diaphragm 36, fuel injection plunger 42, and plates 44 and 46 to move away from adjusting cap 50 aided by spring 58. This action takes place once during each cycle of cylinder 10 as later explained. In the manner described injection plunger 42 is given an oscillatory movement, the frequency of which is a direct function of engine speed. Adjusting cap 50 and adjustable rod 54 are provided to limit the amplitude of the oscillations of plunger 42 and to provide a complete stop therefor if desired.

Plunger 42 of fuel pump 12 extends into cylinder 59 within fuel tank 16. As shown, check valves 62 and 64 are provided attached to cylinder 59. Check valve 62 is open directly to the fuel in fuel tank 16 and functions to allow fuel to fill end chamber 66 at the end of cylinder 59 as plunger 42 is moved toward cap 50. Check valve 64 is closed at this time. As plunger 42 moves away from cap 50 aided by spring 58 check valve 62 closes and check valve 64 opens allowing fuel trapped in chamber 66 to be forced under pressure through fuel injection line 20 to fuel injection valve 14.

Fuel injection valve 14 comprises a hollow cylinder body 68 threaded into cylinder 24 of engine 10, a spring biased piston member 70 slidable in cylinder 68, an annular fuel coupling member 72 for coupling fuel from fuel injection line 20 into cylinder body 68, a retaining cap 74 threaded on the end of the cylinder body 68 as shown, a vent screw 77 threaded into retaining cap 74 and extending into cylinder body 68, and a biasing spring 78 secured to pin 79 which is mounted between the walls of body 68 as shown. Cylinder body 68 is divided into chambers 80 and 82 by piston 70. As indicated piston 70 is provided with a groove 84 forming with the adjacent walls of cylinder body 68 a passage between chambers 80 and 82. Passage 86 is provided between chamber 82 and the interior of cylinder 24. A valve seat 88 is provided at the cylinder end of passage 86. Piston 70 has arm 90 rigidly attached thereto and movable therewith. Arm 90 extends through passage 86 and terminates within cylinder 24 in a valve 92 adapted to seat on valve seat 88. Spring 78 biases piston 70 so that valve 92 seats on valve seat 88 to close passage 86 allowing no fuel to flow into cylinder 24.

When fuel under pressure from fuel pump 12 is pumped through fuel injection line 20 it enters the annular pocket 94 in fuel coupling member 72 and passes through the orifice 76 in the wall of cylinder body 68 into chamber 80. Pressure from the fuel entering chamber 80 forces piston 70 away from retaining cap 74 in opposition to biasing spring 78 thereby unseating valve 92 and causing fuel in chamber 82 to be injected under high pressure into cylinder 24 through passage 86 around arm 90. When fuel pressure from line 20 is decreased the spring 78 causes valve 92 to reseat on valve seat 88 stopping the flow of fuel to cylinder 24. In the reseating of valve 92 piston 70 is moved toward retaining cap 74 and fuel in chamber 80 is forced through groove 84 into chamber 82 where it is retained until fuel from pump 12 again forces piston 70 away from cap 74 causing the fuel to be injected under high pressure into the cylinder 24. The groove 84 presents negligible cross-sectional area for escape of fuel into chamber 80 or equalization of pressure in chambers 80 and 82 during movement of piston 70 away from cap 74.

It should now be evident that the system thus far explained will inject fuel from tank 16 into cylinder 24 and will therefore provide additional power and efficiency in engine operation. Further efficiency is provided in the fuel injection system herein set forth in the manner of lubricating the engine. As well known it has been past practice with two cycle engines of the boat outboard type to mix the lubricant with the fuel and thereby lubricate the engine as the fuel is consumed. With such lubrication methods much of the lubricant is often wasted through exhaustion with the combustion products of the fuel. Therefore, according to the invention lubricant is supplied separately to the engine in measured quantities. Lubricant storage tank 18 is provided with a small orifice 95 in the bottom thereof located in relation to plunger 43 so that it is closed thereby when the plunger is in the non-reciprocating position. Lubricant line 23 is located immediately below orifice 95 in line therewith. An annular groove 96 is provided on fuel injection plunger 42 as shown. During reciprocation of plunger 42 the groove 96 is aligned with orifice 95 and lubricant line 23 as the plunger moves toward cap 50. Lubricant is thereby allowed to flow from tank 18, through orifice 94, around groove 96, through lubricant line 23 and into the air intake passage 98 of engine 10 where it is mixed with the air passing throttle valve 100 and then is drawn past reed valve 102 into crankcase 28 to lubricate the engine. It will be noted that the frequency at which lubricant is admitted into lubricant line 23 is determined by the reciprocation speed of plunger 42 which as will be shortly seen is determined by engine speed. Therefore more lubricant is supplied to the engine during faster operation thereof which is of course desirable. Also, by proper placement of groove 96 and selection of the width thereof the degree of alignment of the groove 96 with orifice 95 and lubricant line 23 during reciprocation of plunger 42 and therefore the amount of lubricant passed to line 23 may be regulated. Further regulation of the lubricant flow to line 23 may be accomplished by adjustment of the amplitude of oscillation of plunger 42 with cap 50 or rod 54.

The complete operation of the fuel injection system in conjunction with engine 10 will now be described. With engine 10 operating assume combustion of fuel has just occurred in cylinder 24. Piston 26 is forced toward sealed crankcase 28 closing reed valve 102 and causing pressure above atmospheric to build up in crankcase 28. Since pressure line 22 is open to crankcase 28 the pressure in chamber 60 of fuel pump 12 will also rise above atmospheric and move diaphragm 36 and attached fuel injection plunger 42 toward cap 50 in opposition to spring 58. As plunger 42 moves toward cap 50 groove 96 aligns with orifice 95 and lubricant feed line 23 allowing lubricant to pass to line 23. Check valve 62 also opens as plunger 42 moves toward cap 50 during the down stroke of piston 26 of engine 10 admitting fuel to chamber 66 of cylinder 59.

As piston 26 passes port 104 in the wall of cylinder 24 the compressed air and lubricant mixture in the crankcase is allowed to enter cylinder 24. The pressure in crankcase 28 is thus reduced. Piston 26 then begins its upward stroke further reducing the pressure in crankcase 28 until the pressure therein is below atmospheric and reed valve 102 is opened. Air is then drawn into the crankcase past throttle valve 100 where it mixes with lubricant from line 23. Air is also drawn from chamber 60 of fuel pump 12 as piston 26 proceeds upward causing the pressure therein to fall below atmospheric. The plunger 42 then with the help of spring 58 moves sharply away from cap 50. Lubricant outlet 95 is thus closed, check valve 62 is closed and fuel in chamber 66 is forced under pressure through check valve 64 along fuel injection line 20 into fuel injector valve 14.

The fuel from fuel injection line 20 passes around annular fuel coupling 72 and into chamber 80 of the fuel injection valve through orifice 76. Fuel under pressure in chamber 80 forces piston 70 away from cap 74 causing valve 92 to become unseated and fuel in chamber 82 to be injected under pressure into cylinder 24. The fuel in combination with the air entering port 104 is then ignited by a spark from spark plug 106 and the cycle begins again with the downward movement of piston 26.

It will be noted that the fuel injection system disclosed may be easily installed on existing engines by merely attaching fuel injector valve 14 to cylinder 24 and providing attachments for pressure passage 22 and lubricant line 23. The normal fuel tank may be supplied with the necessary attachments as shown in conjunction with a lubricant storage tank or a separate fuel tank may be supplied if desired in installation of the fuel injection system on an existing engine.

Also, it should be evident that when the fuel injection system disclosed is attached to an engine conversion back to normal operation may be obtained by supplying a valve 108 in pressure passage 22 to close the passage and opening the usual fuel line to the engine. With pressure passage 22 closed plunger 42 will not oscillate so valve 92 and orifice 95 will remain closed during operation of engine 10.

What I claim as my invention is:

1. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine.

2. In a two cycle internal combusion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, and means also operated by the pulsating pressure in said crankcase to separately supply lubricant to said engine.

3. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, a fuel injection pump connected between said crankcase and fuel storage tank, and a fuel injector valve set in said cylinder and connected to said fuel injector pump, said fuel injector pump operable on application thereto of the pulsating pressure from the crankcase to pump fuel under pressure to said fuel injector valve, the fuel injector valve being operable on application of fuel under pressure thereto to inject fuel under pressure into said cylinder.

4. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, a fuel injector pump connected between said crankcase and fuel storage tank, and a fuel injector valve set in said cylinder and connected to said fuel injector pump, said fuel injector pump operable on application thereto of the pulsating pressure from the crankcase to pump fuel under pressure to said fuel injector valve, the fuel injector valve being operable on application of fuel under pressure thereto to inject fuel under greater pressure into said cylinder.

5. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, and means also operated by the pulsating pressure in said crankcase to separately supply lubricant to said engine, said last mentioned means including an air supply passage for said engine, a separate lubricant storage tank, and means responsive to said pulsating pressure to meter lubricant to the air supply passage of said engine.

6. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, and means also operated by the pulsating pressure in said crankcase to separately supply lubricant to said engine, said last mentioned means including an air supply passage for said engine, a separate lubricant storage tank, and means responsive to said pulsating pressure to meter lubricant to the air supply passage of said engine at a rate proportional to the speed of said engine.

7. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder, and a passage connecting said pressure chamber and said crankcase, said diaphragm being operable on the application of the pulsating pressure from said crankcase to said pressure chamber to cause said plunger to oscillate.

8. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, said fuel injector pump also including biasing means associated with said diaphragm biasing said diaphragm in a direction to insert said plunger in said cylinder.

9. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, said fuel injector pump also including biasing means associated with said diaphragm biasing said diaphragm in a direction to insert said plunger in said cylinder, and means for adjusting the biasing force applied to said diaphragm by said biasing means.

10. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, said fuel injector pump also including adjustable means to limit the stroke of said plunger in said cylinder.

11. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith when the gases in said cylinder are under high compression to cause firing of the fuel and operation of said engine, including a fuel storage tank associated with said engine, a fuel injector pump connected between said crankcase and fuel storage tank, and a fuel injector valve set in said cylinder and connected to said fuel injector pump, comprising a hollow housing removably connected to said cylinder at one end through an orifice which terminates in a valve seat, a piston slidably mounted in said housing and having an arm extending through said orifice and terminating in a valve adapted to fit within said valve seat and close said orifice, a groove in said piston surface axial with respect to said housing, a spring means biasing said piston in a direction to close said orifice, means closing the other end of said housing, and means connecting the interior of said housing at a point between said piston and closing means to said fuel pump, whereby when said fuel pump is actuated the piston is forced toward said one end of said housing under pressure of fuel from said fuel pump in opposition to said resilient means thereby unseating the valve on said piston arm allowing fuel trapped between the piston and said one end of the housing to escape under pressure into the cylinder through said orifice.

12. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, and means also operated by the pulsating pressure in said crankcase to separately supply lubricant to said engine, said last mentioned means including a separate lubricant storage tank having a discharge orifice therein operably associated with said fuel pump and a lubrication passage one end of which is connected to the air intake of said engine, the other end of which is operably associated with said fuel pump and means in said fuel pump whereby a direct connection is made between said discharge orifice and lubrication passage on operation of said fuel pump.

13. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, and means also operated by the pulsating pressure in said crankcase to separately supply lubricant to said engine, said last mentioned means including a separate lubricant storage tank having a discharge orifice therein operably associated with said fuel pump and a lubrication passage one end of which is connected to the air intake of said engine, the other end of which is operably associated with said fuel pump and means in said fuel pump whereby a direct connection is made between said discharge orifice and lubrication passage on operation of said fuel pump, the length of time said direct connection is made and the quantity of lubricant discharged from said orifice during the operation of said fuel pump depending on the speed of operation of said engine.

14. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, and means also operated by the pulsating pressure in said crankcase to separately supply lubricant to said engine.

15. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, including a fuel storage tank associated with said engine, and a fuel injector pump connected between said crankcase and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, and means also operated by the pulsating pressure in said crank case to separately supply lubricant to said engine, said last mentioned means including an annular groove on said fuel injection plunger, a separate lubricant storage tank having a discharge orifice therein operably associated with said annular groove on said fuel injection plunger, and a lubricant passage one end of which is connected to the air intake of said engine, the other end of which is operably associated with said annular groove and in line with said discharge orifice, said fuel injection plunger being operative on reciprocation during operation of said fuel pump to periodically align a portion of said groove with said discharge orifice and lubricant passage allowing lubricant to pass from the lubricant storage tank to the air intake passage of the engine.

16. In a two cycle internal combustion engine including one or more cylinders each having a separate pressurized crankcase section associated therewith wherein pulsating pressure is developed during operation of said engine, means operated by the pulsating pressure in the crankcase to automatically inject fuel under pressure into the cylinder associated therewith at the proper time to cause firing of the fuel and operation of said engine, including a fuel storage tank associated with said engine, and a fuel injector pump connected between said crank case and fuel storage tank comprising, a housing pressure sealed to said fuel storage tank, a diaphragm centrally located within said housing and forming a pressure chamber with said housing and that portion of the fuel storage tank included by said housing, a fuel injection cylinder located within said fuel tank and in open communication with said pressure chamber at one end and having inlet and outlet check valves at the other, a fuel injection plunger with one end attached to said diaphragm and the other end slidably inserted within said one end of said fuel injection cylinder and a passage connecting said pressure chamber and said crankcase, said diaphragm being operable on the application of the pulsating pressure from said crankcase to said pressure chamber to cause said plunger to oscillate, and means also operated by the pulsating pressure in said crankcase to separately supply lubricant to said engine, said last mentioned means including an annular groove on said fuel injection plunger, a separate lubricant storage tank having a discharge orifice therein operably associated with said annular groove on said fuel injection plunger, and a lubricant passage one end of which is connected to the air intake of said engine, the other end of which is operably associated with said annular groove and in line with said discharge orifice, said fuel injection plunger being operative on reciprocation during operation of said fuel pump to periodically align a portion of said groove with said discharge orifice and lubricant passage allowing lubricant to pass from the lubricant storage tank to the air intake passage of the engine, the degree of alignment of the annular groove, discharge orifice and lubricant passage and therefore the amount of lubricant fed to the engine being a direct function of engine speed.

17. A two cycle internal combustion engine including a cylinder and a piston reciprocal within said cylinder in compression and power strokes operable to periodically place gases within said cylinder under high compression during the compression stroke, said engine also including a separate pressurized crankcase section associated with said cylinder and piston wherein pulsating pressure is developed on reciprocation of said piston during operation of said engine, and means operated by the pulsating pressure in the crankcase to automatically inject fuel under pressure into the cylinder associated therewith when the gases in said cylinder are under high compression to cause firing of the fuel and operation of said engine.

18. A two cycle internal combustion engine including a cylinder and a piston reciprocal within said cylinder in compression and power strokes operable to periodically place gases within said cylinder under high compression during the compression stroke, said engine also including a separate pressurized crankcase section associated with said cylinder and piston wherein pulsating pressure is developed on reciprocation of said piston during operation of said engine, and means operated by the pulsating pressure in the crankcase to automatically inject fuel under pressure into the cylinder associated therewith as the piston nears the end of its compression stroke to cause firing of the fuel and operation of said engine.

19. An engine including a fuel pump, separate engine lubricant supply apparatus comprising a separate lubricant storage tank having a discharge orifice therein operably associated with said fuel pump, a lubrication passage one end of which is connected to the air intake of said engine, the other end of which is operably associated with said fuel pump, and means in said fuel pump whereby a direct connection is made between said discharge orifice and lubrication passage on operation of the fuel pump.

20. An engine including a fuel pump, separate engine lubricant supply apparatus comprising a separate lubricant storage tank having a discharge orifice therein operably associated with said fuel pump, a lubrication passage one end of which is connected to the air intake of said engine, the other of which is operably associated with said fuel pump, and means in said fuel pump whereby a direct connection is made between said discharge orifice and lubrication passage on operation of the fuel pump, the length of time said direct connection is made and the quantity of lubricant discharged from said orifice during the operation of said fuel pump depending on the speed of operation of said engine.

References Cited in the file of this patent

UNITED STATES PATENTS

| | | |
|---|---|---|
| 1,893,457 | Tartrais | Jan. 3, 1933 |
| 2,598,528 | French | May 27, 1952 |
| 2,703,562 | Seubert | Mar. 8, 1955 |
| 2,820,673 | Zubaty | Jan. 21, 1958 |

FOREIGN PATENTS

| | | |
|---|---|---|
| 8,156 | Great Britain | of 1909 |
| 24,337 | Great Britain | of 1912 |
| 265,103 | Italy | May 24, 1929 |
| 930,988 | France | Sept. 15, 1947 |